United States Patent
Wong et al.

(10) Patent No.: US 7,168,813 B2
(45) Date of Patent: *Jan. 30, 2007

(54) MEDIACUBE

(75) Inventors: Curtis Glenn Wong, Bellevue, WA (US); Steven M. Drucker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 259 days.

This patent is subject to a terminal disclaimer.

(21) Appl. No.: 10/870,816

(22) Filed: Jun. 17, 2004

(65) Prior Publication Data

US 2005/0280631 A1    Dec. 22, 2005

(51) Int. Cl.
*G03B 21/14* (2006.01)
*G02B 6/06* (2006.01)

(52) U.S. Cl. ............... 353/120; 353/122; 385/116; 385/901

(58) Field of Classification Search ............. 353/38, 353/81, 99, 122, 120, 10; 385/901, 120, 385/116, 133
See application file for complete search history.

(56) References Cited

U.S. PATENT DOCUMENTS

| | | | | |
|---|---|---|---|---|
| 3,402,000 A | * | 9/1968 | Crawford | .................. 385/116 |
| 3,874,783 A | * | 4/1975 | Cole | .......................... 385/115 |
| 4,923,282 A | * | 5/1990 | Spitzberg | .................. 359/737 |
| 4,992,650 A | | 2/1991 | Somerville | .................. 235/462 |
| 5,511,141 A | * | 4/1996 | Peli | .......................... 385/116 |
| 5,684,906 A | * | 11/1997 | Sugawara | .................. 385/120 |
| 6,476,378 B2 | * | 11/2002 | Nougaret et al. | ...... 250/227.11 |
| 2004/0017985 A1 | * | 1/2004 | Cok et al. | .................. 385/120 |

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.
"Bar Code 1, 2-Dimensional Bar Code Page." Available http://www.adams1.com/pub/russadam/stack.html. Printed Jan. 20, 2004. 14pp.
Ambiente article. "Interac Table®." Dated Jul. 7, 2k. Available http://www.darmstadt.gmd.de/ambiente/activities/interactable.html. Printed Nov. 21, 2003. 3pp.

(Continued)

Primary Examiner—William C. Dowling
(74) Attorney, Agent, or Firm—Ronald M. Anderson (57) ABSTRACT

An object placed on a display surface conveys an image appearing on the display surface to a surface of the object. The object can include one or more optical elements such as a lens, or may include a plurality of fused fiber optics or collimated light tubes to convey the image appearing under the object to a different surface. The image can thus be made to appear on a side of the object, or on an intermediate surface within the object, or on a top surface of the object. In addition, on an interactive display device, the user is enabled to interact with the image and the object, for example, by using a gesture to move the image about on the display surface so that it is moved toward and under the object and thereafter appears on the surface of the object.

24 Claims, 7 Drawing Sheets

OTHER PUBLICATIONS

Bier, Stone, Pier, Buston, and DeRose. "Toolglass and Magic Lenses: The See-Through Interface." *Proceedings of Siggraph '93* (Anaheim, Aug.). *Computer Graphics Annual Conference Series*, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438 -x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rig/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2 &tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp ) and http://www.dielectronics.com/Accessories/GP2D05.html (1 pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003. 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR'2000, Oct. 5-6, 2000*, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3 pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptural User Interactes (PUI'97)*, 1997. 3pp.

Rekimoto and Nagao. "The World through the Computer: Computer Augmented Interaction with Real World Environments." *Proceedings of UIST'95*, pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5 pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com—Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03. European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar.+ Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

SMART Technologies Inc. White Paper. "DViT Digital Vision Touch Technology." Feb. 2003. 10pp.

Smart Technologies, Inc. "Rear Projection SMART Board™ Interactive Whiteboard""SMART Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM, ACM-0-89791-999-8/98/007. 8pp.

Ullmer, Ishii, and Jacob. "Tangible query Interfaces: Physically Constrained Tokens for Manipulating Database Queries." *Proc. INTERACT 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VIRTUALBOARD." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

* cited by examiner

MEDIACUBE

FIELD OF THE INVENTION

The present invention generally relates to use of an object having an optical path for modifying the display of an image projected onto a display surface so that the image no longer appears on the display surface, and more specifically, relates to shifting the image from the display surface so that the image appears to be displayed instead either within the object or on a surface of the object.

BACKGROUND OF THE INVENTION

Most personal computers (PCs) employ a monitor or display screen to display text and graphics to a user. Touch screens or other touch-sensitive displays, such as those used on Tablet PCs, enable a more interactive and richer experience for a user by responding to an object such as a stylus that is brought near or into contact with the surface of the display screen, to enable the user to make selections of items that are displayed and to move such items around on the display. Although tablets greatly improve the functionality of a simple display screen, they are still generally limited in their response to an object.

The prior art also includes other types of interactive display systems that enable multiple objects placed on a display surface to be recognized and to respond to such objects. For example, a user interface platform was developed in the MIT Media Lab, as reported by Brygg Ullmer and Hiroshi Ishii in "The metaDESK: Models and Prototypes for Tangible User Interfaces," *Proceedings of UIST* 10/1997:14–17. The metaDESK includes a near-horizontal graphical surface used to display two-dimensional (2D) geographical information. Above the graphical surface is disposed an arm-mounted flat-panel display that serves as an "active lens" for use in displaying three-dimensional (3D) geographical information. A computer vision system inside the desk unit (i.e., below the graphical surface) includes infrared (IR) lamps, an IR camera, a video camera, a video projector, and mirrors. The mirrors reflect the graphical image projected by the projector onto the underside of the graphical display surface. The IR camera in the metaDESK can detect a reflection from an IR reflective material applied to the undersurface of passive objects called "phicons" that are placed on the graphical surface. In response to the IR camera detecting the IR reflective material (which is transparent to visible light) applied to the bottom of a "Great Dome phicon," a map of the MIT campus is displayed on the graphical surface, with the actual location of the Great Dome in the map positioned where the Great Dome phicon is located. Moving the Great Dome phicon over the graphical surface manipulates the displayed map by rotating or translating the map in correspondence to the movement of the phicon by a user.

Also included with the metaDESK is a "passive lens" that is constructed of a 1 cm thick fiber-optic cluster material formed as a circle of about 12 cm in diameter and supported in a ring formed by a wooden frame that is provided with a handle. The image displayed on the metaDESK can include a circular region that is projected onto the display surface at the location of the passive lens, so that the portion of the displayed image under the passive lens is conveyed through the fiber-optic cluster material and appears on the upper surface of the passive lens. The article reports that earlier passive lenses that were made without any lens material or by simply using clear PLEXIGLAS™ were not successful in sustaining the illusion that the passive lens is a separate screen. Use of the fiber-optic cluster material was apparently more successful in providing this illusion.

When the passive lens is moved over the display surface of the metaDESK, the portion of the displayed image that is to appear on the upper surface of the passive lens is moved to track with the current location of the passive lens. In an initial embodiment, the location of the passive lens on the display was apparently detected and tracked using the IR camera vision sensing system. However, the article relates that subsequently, "a 'Flock of Birds' sensor was used to provide faster, more precise graphics updates." (The FLOCK OF BIRDS™ sensor is a pulsed direct current (DC) magnetic tracking sensor sold by Ascension Technology Corporation.) The magnetic-field position sensor (FLOCK OF BIRDS™) and electrical-contact sensors are included in the metaDESK.

Although the prior art passive lens developed for use with the metaDESK appears to shift an image from the display surface to the upper surface of the passive filter, there is no provision for making the image projected on the display surface appear to be within the interior of an object. Similarly, there is no provision for making the image appear on another surface of an object, such as the side of a cube. When using the object while playing a game, it would be useful to display information or images that are only visible to a player on one side of the display surface, but not visible to players on the other sides of the display surface. Accordingly, it would be desirable to have the image appear on a side of the cube and thus, not readily visible to the other players located around the display surface. In addition, the prior art does not indicate how the passive lens of the metaDESK can be made to be interactive with the user or to respond to interactive gestures by the user. For example, it would be desirable to enable a user to select and move a graphic icon or other image toward an object positioned on the display surface and when the icon reaches the object, convey the graphic icon or image to a surface that is on or within the object. The graphic icon or other image would thus appear to be within or on a surface of the object. Again, the prior art does not discuss this form of interaction.

Another interactive display surface is disclosed in several papers published by Jun Rekimoto of Sony Computer Science Laboratory, Inc. in collaboration with others. These papers briefly describe a "HoloWall" and a "HoloTable," both of which use IR light to detect objects that are proximate to or in contact with a display surface on which a rear-projected image is visible. The rear-projection panel, which is vertical in the HoloWall and horizontal in the HoloTable, is semi-opaque and diffusive, so that objects become more clearly visible as they approach and then contact the panel. The objects thus detected can be a user's fingers or hands, or other objects. One of these papers, entitled "DataTiles: A Modular Platform for Mixed Physical and Graphical Interactions," by J. Rekimoto et al., SIGCHI'01, Mar. 31, 2001, explains how objects tagged with a radio frequency identifier (RFID) and referred to as "tiles" can serve various functions when placed on a surface of a flat panel display that is able to read the RFID of the tile and respond in several different ways. For example, graphic data can be displayed and seen "within" the tiles (actually, an image on the display surface is viewed through the transparent tiles). However, there is no teaching or suggestion of how to convey an image displayed under an object, so that the image appears on or truly within the object. Accordingly, it will be apparent that an object and display system providing a richer experience and capable of conveying an image to a different surface of an object would be preferable, compared to the prior art approach.

SUMMARY OF THE INVENTION

An initial embodiment of the present invention is intended to be used with an interactive display, provided as an interactive display table, but is also usable with other types of displays. In this invention, a portion of the entire image appearing on a display surface is directed toward the location of an object on the display surface. The object is constructed so that the portion of the image directed to a region of the display surface that is covered by the object is made to appear on or within the object. The advantage of using the invention with an interactive display system that can detect objects and their position on the display surface is that determining the location of the object on the display surface, the portion of the image intended to be redirected by the object can readily be made to track the object, wherever the object is located on the display surface, even if the object is moved about on the display surface.

Thus, the portion of the image beneath the object can take the form of a plurality of media objects representing, for example, graphic images, animations, or videos, that appear to float around in a three-dimensional space inside the cube. Viewed from above or from the side, that cube can appear to be a physical container of a plurality of these virtual media objects that are static or more preferably, dynamically moving within the cube. The object can also be manipulated, e.g., rotated, for example (where the display table would indicate parameters controlled by the manipulation of the object, and the results) to open the virtual container represented by the object, causing the media objects within the cube to appear to "pour out" of the object and on to the display surface. A user can then interact with the media objects appearing on the display table and any changes saved. Accordingly, when the media objects are then whisked back into the cube, they can appear (newly updated) as a revised set of media objects within the cube.

In addition, a user can interact with an image that is to be redirected by the object when the image is not yet covered by the object and is visible on the display surface. For example, by using a finger or other device to select the image that is visible on the display surface, the image can then be made to move toward the object. When the selected image moves under the object, the image will be conveyed to a surface within or on the object.

Accordingly, a first aspect of the present invention is directed to an object for shifting a displayed image from a display surface to a position either within or on the object. The object includes a light guide having a generally planar bottom surface that is adapted to be positioned on a display surface and to cause an image appearing on the display surface to instead appear on a different surface of the object. The light guide conveys light from the image appearing on the display surface to either an intermediate surface that is disposed within the object or to a side of the object. The intermediate surface is generally planar and is spaced apart from a top of the object, and the side of the object is generally planar and has an edge that is adjacent to the display surface.

The light guide preferably comprises one or more optical elements (e.g., one or more lenses), or can comprise fused optical fibers, or collimated light tubes.

One simple embodiment of the object has six outer surfaces. In one version of this embodiment, a top portion is included that is generally optically transparent. Thus, an image appearing on the intermediate surface, which is adjacent to the top portion, is visible and readily viewed through the top portion. The image on the intermediate surface therefore appears to be within the object.

In another embodiment, the light guide causes light from the image appearing on the display surface to be conveyed along a curve, to one side of the object. This side has the edge that is adjacent to the display surface.

Preferably, an identifying characteristic is associated with the object. By detecting the identifying characteristic of the object, the object and its disposition on the display surface are readily determinable. As a result, the image can be made to selectively appear on the display surface under the object, regardless of the disposition of the object on the display surface. The identifying characteristic preferably comprises a light reflective marking applied to a generally planar bottom surface of the object. In this embodiment, the light reflective marking is selected for its ability to efficiently reflect IR light.

Another aspect of the present invention is directed to a method for causing an image to appear either within or on an object that is disposed on a display surface. The method includes the steps of displaying the image on a portion of the display surface where the object is disposed, and conveying the image along an optical path within the object to either an outer surface of the object, or to an interior surface within the object. The outer surface has an edge that is adjacent to the display surface, so that the image is visually perceivable on the outer surface of the object. The interior surface within the object is spaced apart from a top surface of the object, so that the image is visually perceivable on the interior surface and appears to be within the object. Other steps of the method are generally consistent with the functions of the elements of the object discussed above.

Yet another aspect of the present invention is directed to a method for enabling a user interaction with an image appearing on a display surface, so as to cause the image to appear within or on an object that is disposed on the display surface. In this method, the image is made to appear on a portion of the display surface where the object is not disposed. A user is then enabled to select the image and use a gesture to move the image over the display surface toward the object. The motion of the image over the display surface is stopped as the image moves under the object. The image on the display surface is then conveyed along an optical path within the object to either an external surface of the object, or an interior surface within the object. As a result, the image is visually perceivable on either the external surface or the interior surface of the object.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

Exemplary Computing System for Implementing Present Invention

Figure 1:
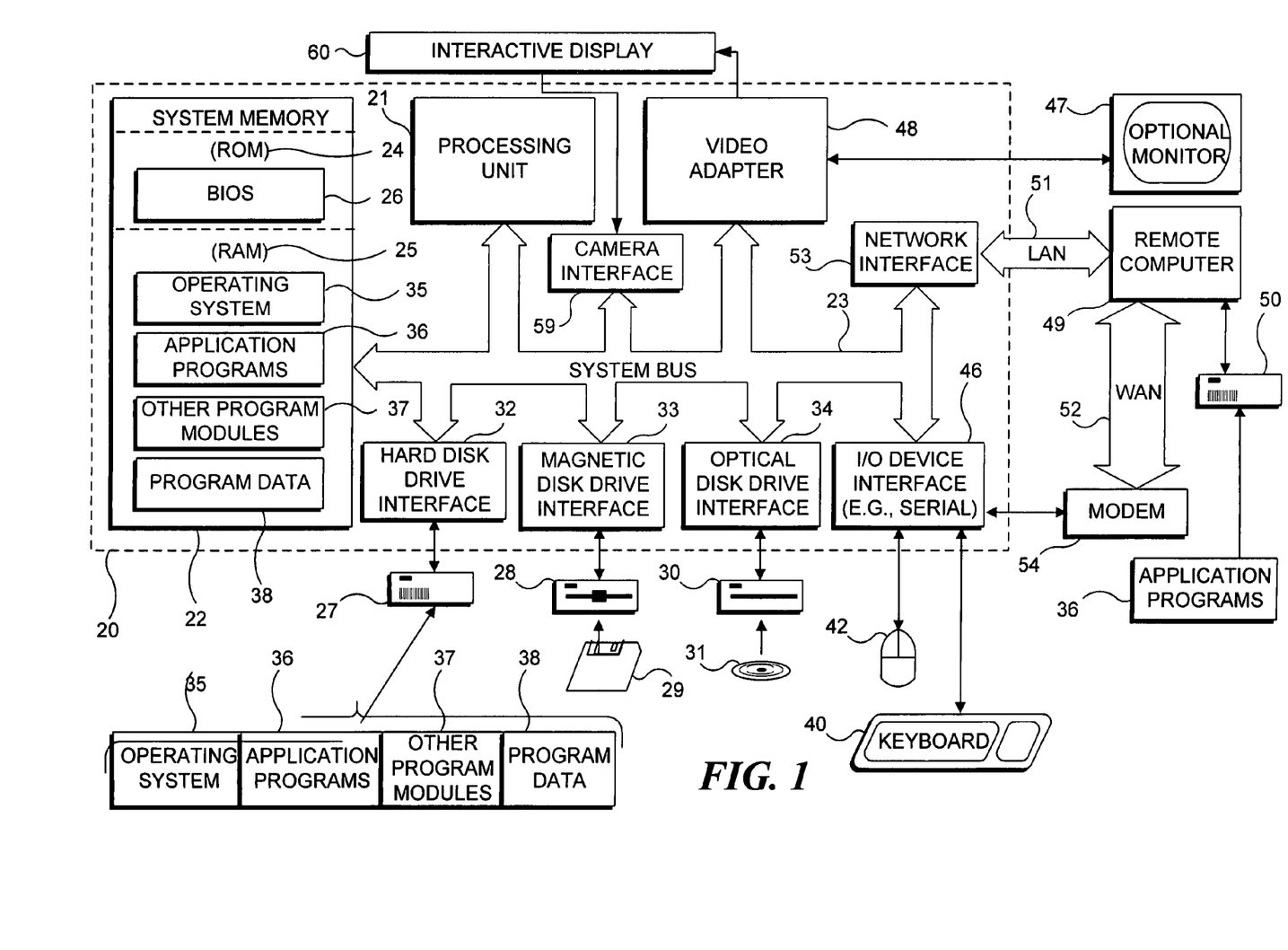
FIG. 1 is a functional block diagram of a generally conventional computing device or PC that is suitable for processing the input and output data used in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals form a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced using a single computing machine, although PC 20 can also operate in a networked environment using logical connections to one or more remote computers, such as a remote computer 49. Remote computer 49 may be another PC, a server (which is typically generally conFIGUREd much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Display Surface

Figure 2:
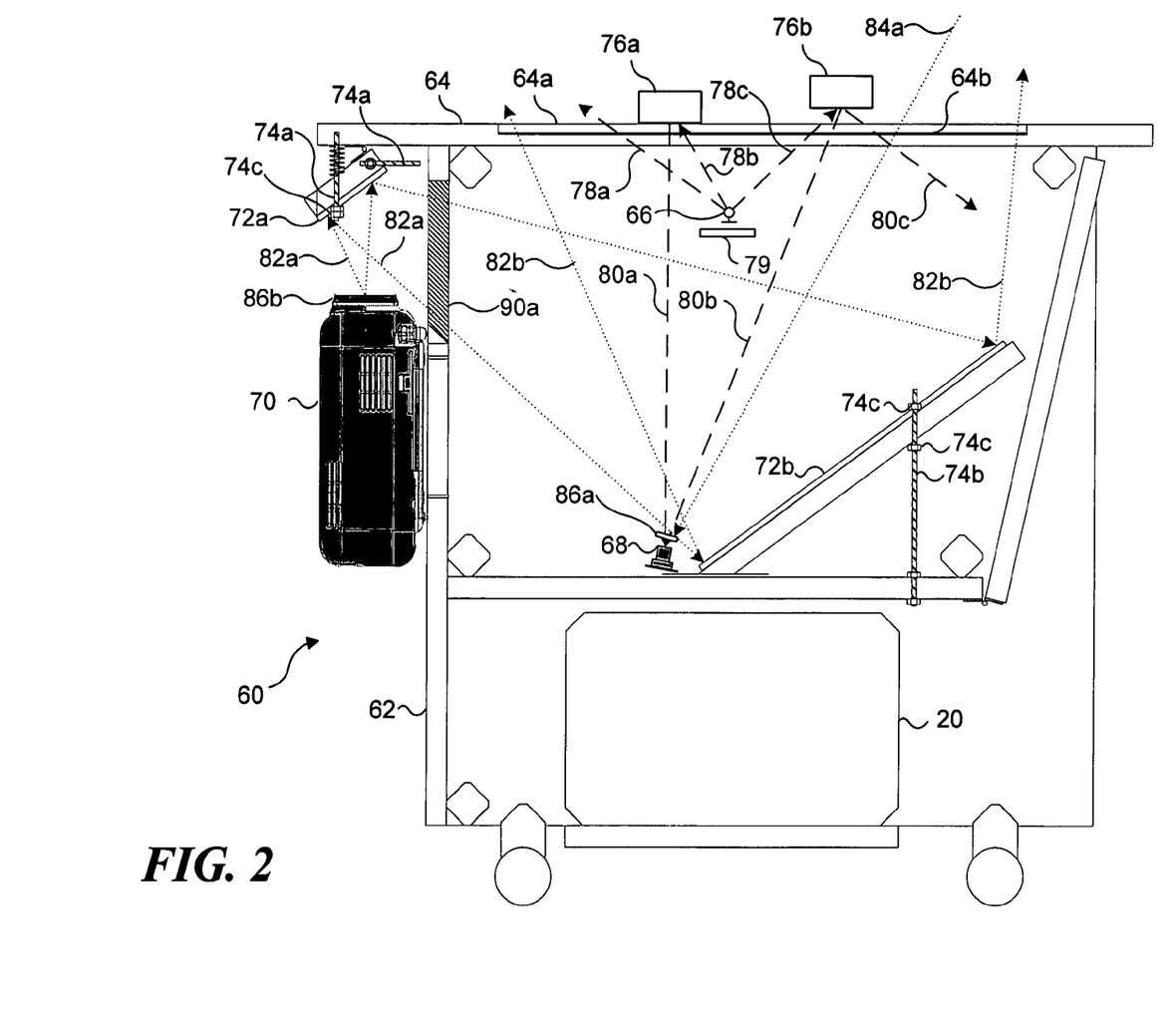
FIG. 2 is an illustration of the interior of an interactive display table showing hardware components of the interactive display table, the paths followed by light within the interactive display table, and an exemplary object disposed on a display surface thereof.

In FIG. 2, an exemplary interactive display table 60 is shown that includes PC 20 within a frame 62 and which serves as both an optical input and video display device for the computer. In this cut-away FIGURE of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
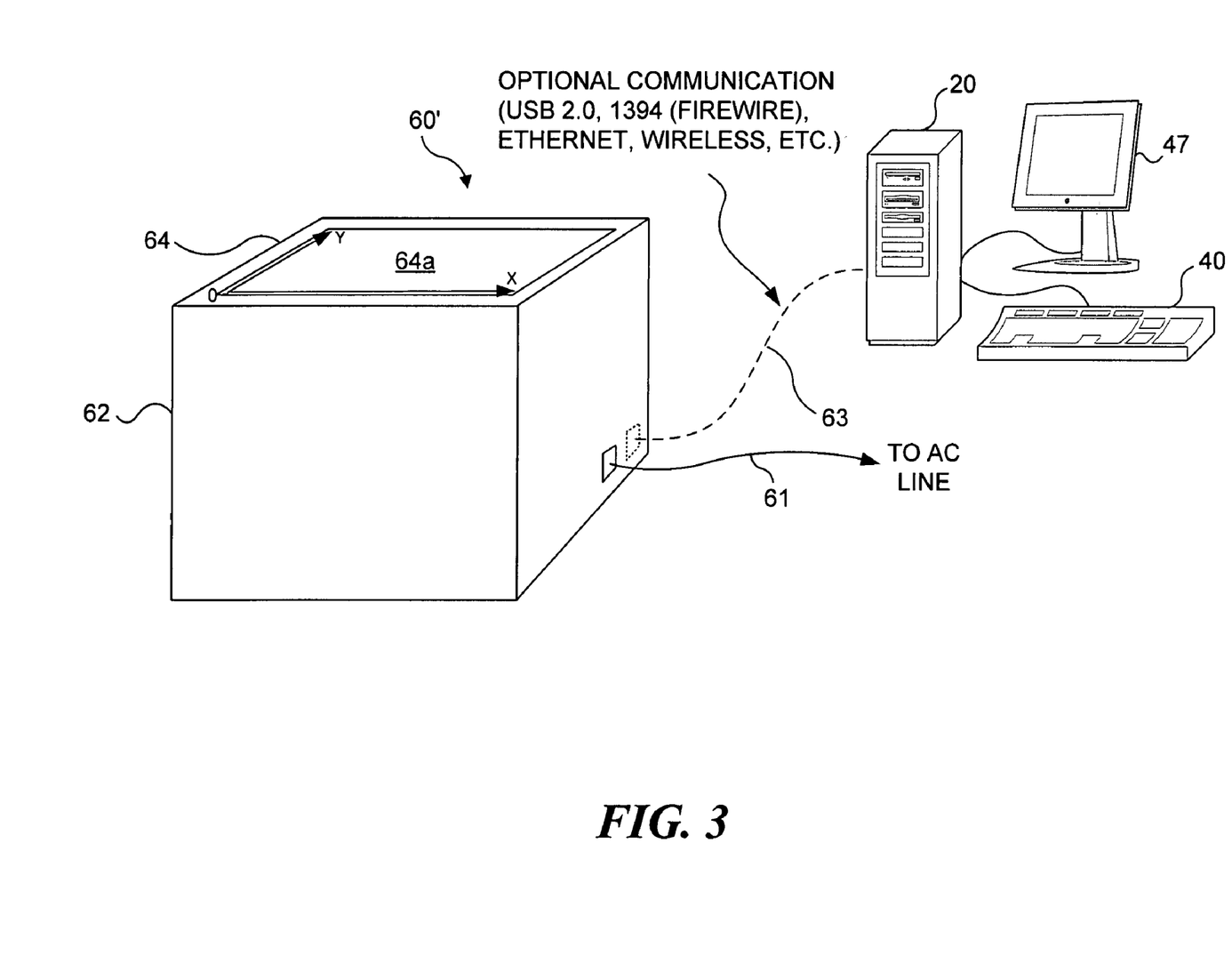
FIG. 3 is a block diagram illustrating how the interactive display table used in connection with the present invention can be coupled to a stand-alone PC or other computing device.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this FIGURE, a set of orthogonal X and Y axes are associated with display surface 64a, as well as an origin indicated by "0." While not discretely shown, it will be appreciated that a plurality of coordinate locations along each orthogonal axis can be employed to specify any location on display surface 64a.

If the interactive display table is connected to an external PC 20 (as in FIG. 3) or to some other type of external computing device, such as a set top box, video game, laptop computer, or media computer (not shown), then the interactive display table comprises an input/output device. Power for the interactive display table is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table.

An important and powerful feature of the interactive display table (i.e., of either embodiments discussed above) is its ability to display graphic images or a virtual environment for games or other software applications and to enable an interaction between the graphic image or virtual environment visible on display surface 64*a* and identified objects that are resting atop the display surface, such as a patterned object 76*a*, or are hovering just above it, such as a patterned object 76*b*.

Again referring to FIG. 2, interactive display table 60 includes a video projector 70 that is used to display graphic images, a virtual environment, or text information on display surface 64*a*. The video projector is preferably of a liquid crystal display (LCD) or digital light processor (DLP) type, with a resolution of at least 640×480 pixels. An IR cut filter 86*b* is mounted in front of the projector lens of video projector 70 to prevent IR light emitted by the video projector from entering the interior of the interactive display table where the IR light might interfere with the IR light reflected from object(s) on or above display surface 64*a*. A first mirror assembly 72*a* directs projected light traveling from the projector lens along dotted path 82*a* through a transparent opening 90*a* in frame 62, so that the projected light is incident on a second mirror assembly 72*b*. Second mirror assembly 72*b* reflects the projected light onto translucent layer 64*b*, which is at the focal point of the projector lens, so that the projected image is visible and in focus on display surface 64*a* for viewing.

Alignment devices 74*a* and 74*b* are provided and include threaded rods and rotatable adjustment nuts 74*c* for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64*b* to enable a longer focal length (and lower cost) projector lens to be used with the projector.

Media Cube—An Exemplary Object for Transferring An Image

As noted above, the present invention can be practiced with almost any type of display where a portion of the image that is displayed is intended to be conveyed internally within an object to a surface on or within the object so that the image appearing on that surface appears to be displayed by the object. However, there are certain advantages in using the present invention with an interactive display device like that described above in connection with FIGS. 2 and 3, since the interactive display device is able to detect a location of the object and also to enable a user to interact with an image that is displayed, in connection with object resting on the display surface of the interactive display device.

Figure 4:
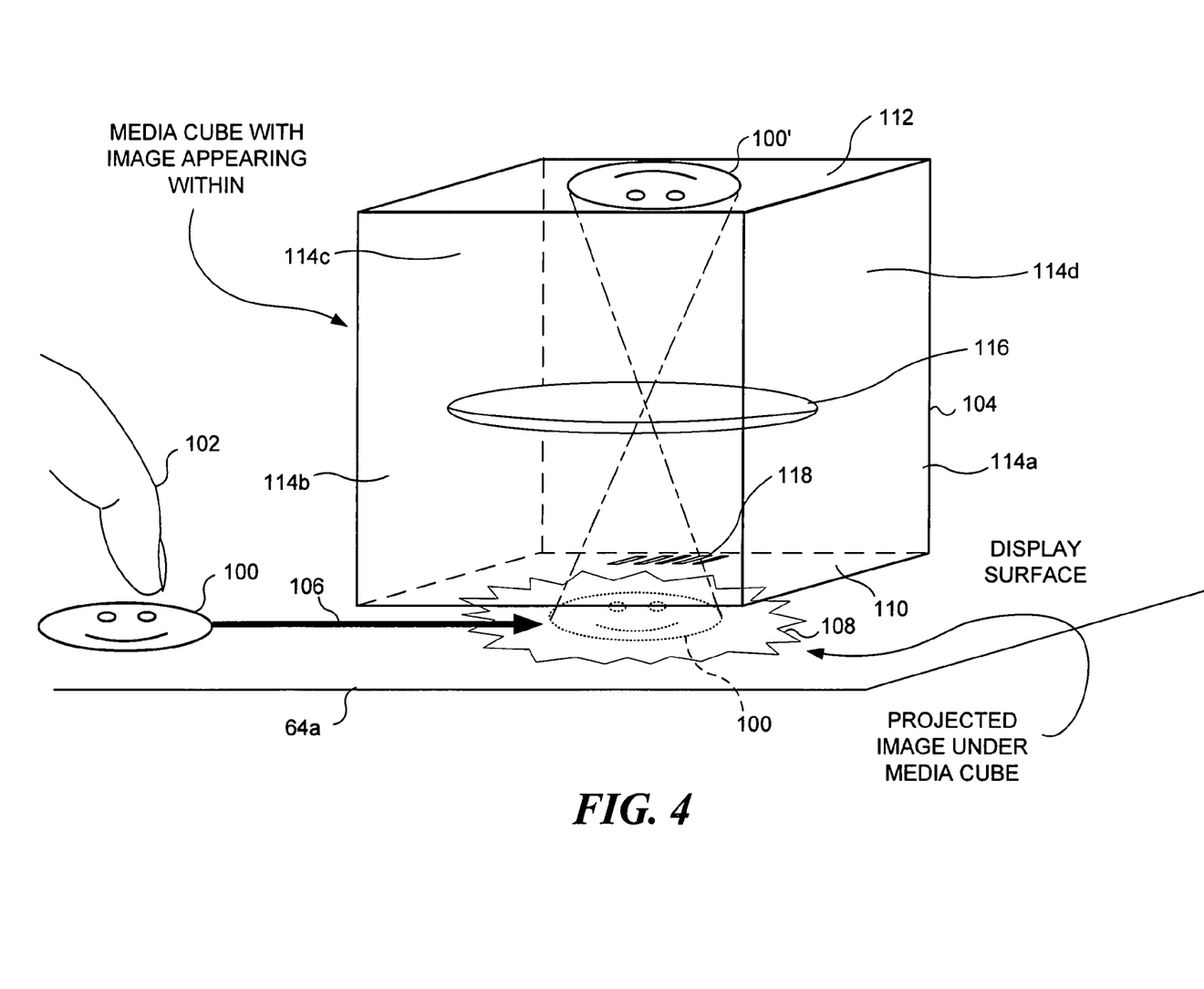
FIG. 4 is a schematic isometric view of a first preferred embodiment of an object that implements the present invention (using an internal lens) and indicating how a user is enabled to interact with a graphic image appearing on an interactive display, causing the graphic image to move under the object, which then conveys the graphic image from the display surface to a surface of the object.

A simple example of the type of interaction enabled by the present invention is shown in FIG. 4. As shown therein, display surface 64*a* of the interactive display table (the remainder of which is not included, to simplify the drawing) is used for displaying a graphic icon 100. In this example, the graphic icon illustrated is commonly known as "a smiley face." The capability of display surface 64*a* and the other components of the interactive display table to detect an object on display surface 64*a* facilitates tracking movement of the object over the display surface. In addition, the interactive display table enable user interacting with graphic icon 100 in connection with an object 104 that is placed upon display surface 64*a*. The interaction can be as simple as a user selecting graphic icon 100 with a finger 102 and then making a gesture so that graphic icon 100 is moved toward object 104, as indicated by an arrow 106. It will be appreciated that object 104 is detected upon display surface 64*a* when placed there by a user, so that its location, size, and orientation on the display surface are known to the system or software application being executed by PC 20 (FIGS. 1–3).

When a user selects graphic icon 100 and generally makes a gesture with finger 102 to flick the graphic icon toward object 104, the aim of the user's flicking gesture need not be perfect, so long as the graphic icon is generally directed toward object 104. In response to the user selecting the graphic icon and making a gesture to flick it toward object 104, the system will cause the graphic icon to appear to slide across display surface 64*a* and will stop the movement of the graphic icon when it is under object 104.

Object 104 includes a bottom surface 110, sides 114*a* through 114*d*, and a top surface 112. In this initial embodiment, object 104 has been referred to as a "media cube," since the object is a cube, having four sides and the top and bottom surfaces of equal area. Although a cube is shown for object 104, the object can have other shapes, so long as the surface to which the image is conveyed and displayed on or within the object is preferably generally planar. Bottom surface 110 rests atop display surface 64*a* so that any image appearing on the display surface 64*a* within a region 108 under bottom surface 110 is automatically projected or convey by a lens 116 onto top surface 112 of object 104. Top surface 112 includes a layer of vellum (not separately shown), or is formed of a diffusing material, so that it appears that graphic icon 100' is actually on top surface 112. Although only a single lens 116 is illustrated for conveying the graphic icon from display surface 64*a* to top surface 112, it will clearly be apparent that a plurality of lenses or other optical components might alternatively be provided within object 104. For example, use of two lenses would avoid the problem shown in FIG. 4 wherein graphic icon 100' appearing on top surface 112 is inverted relative to graphic icon 100 that is on display surface 64*a* under bottom surface 110.

Since multiple objects may be placed on display surface 64*a*, object 104 includes a unique identification (ID) 118 formed with an IR reflecting marking material that is generally transparent to visible light. Thus, the transfer of an image from display surface 64*a* to top surface 112 of object 104 is unaffected by the presence of this IR reflective material on bottom surface 110 of the object. While an exemplary barcode pattern is shown for ID 118 in FIG. 4, many other ID patterns for encoding and identifying object 104 can instead be used. It should also be clearly understood that instead of a graphic icon, text or any other image that can be displayed on display surface 64*a* can alternatively be conveyed within object 110 to a surface of the object, such as top surface 112, so that the displayed image appear to be on that surface instead of on display surface 64*a*.

Figure 5:
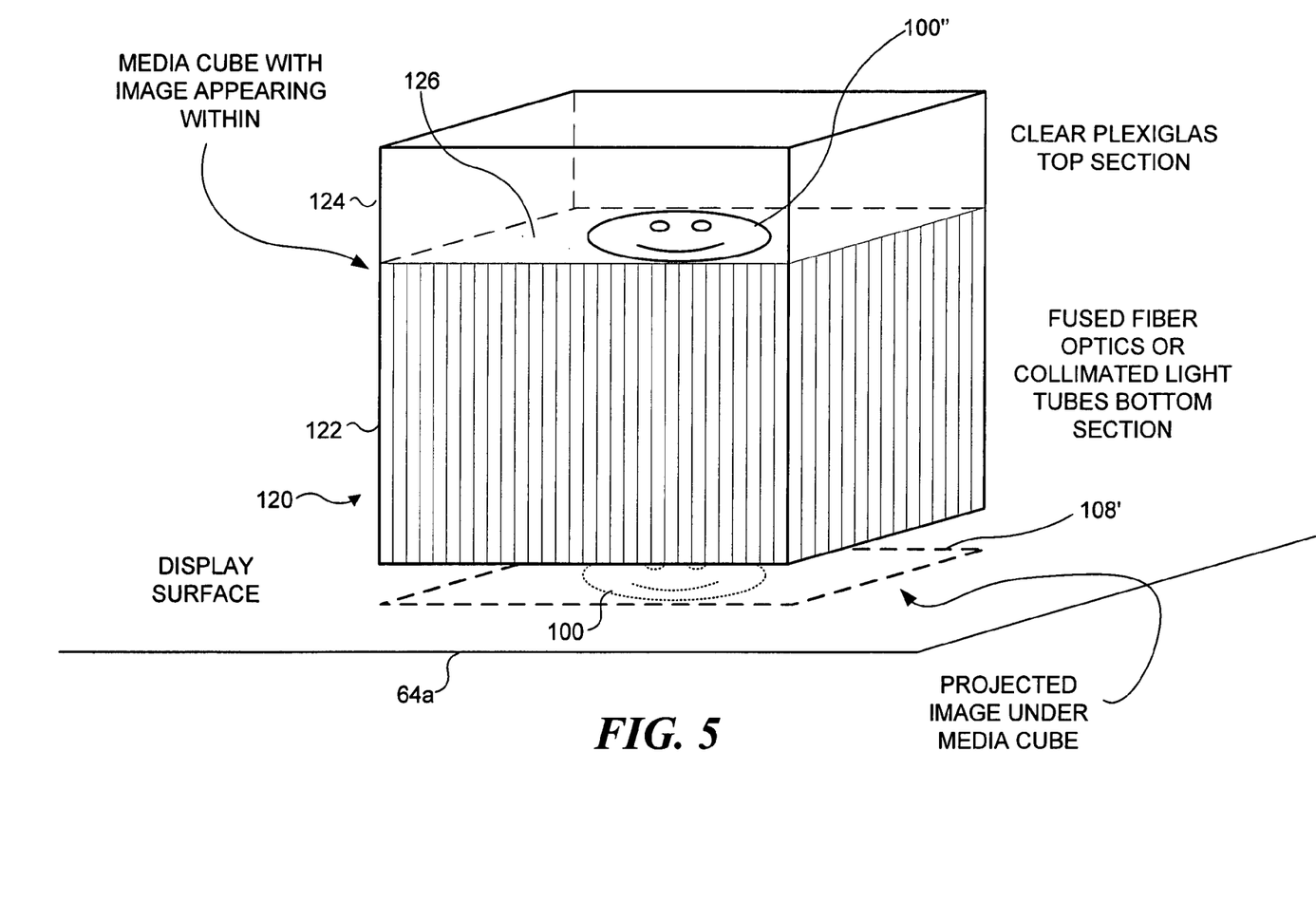
FIG. 5 is an isometric schematic view of a second preferred embodiment, wherein the object includes either fused fiber optics or collimated light tubes in a bottom section that are used to convey an image from a display surface to an intermediate surface within the object, so that the image is visible through a clear top portion of the object.

Referring now to FIG. 5, a second embodiment of the present invention is illustrated, again in the form of a cube, although objects having other shapes, such as a wedge, cylinder, etc., can instead be used. In this embodiment, an object 120 includes a bottom section 122 comprising a plurality of fused fiber optics, or alternatively a plurality of collimated light tubes (not separately identified). Though not shown, it will be appreciated that the lower end of the fused fiber optics or collimated light tubes form a planar surface corresponding to bottom surface 110 of object 104 (which is shown in FIG. 4). A top section 124 of object 120 is formed of a clear plastic material, such as PLEXIGLAS™. The fused fiber optics or collimated light tubes of bottom section 122 convey graphic icon 100 to a diffusing surface 126 formed between adjacent to top section 124. Thus, a user can observe a graphic icon 100" on diffusing surface 126 as if the graphic icon were being displayed there. Again, almost any graphic material, text, or other image appearing within a region 108' that is in contact with the lower end of the fused fiber optics or collimated light tubes can be conveyed through bottom section 122 to appear on diffusing surface 126 of object 120.

Figure 6:
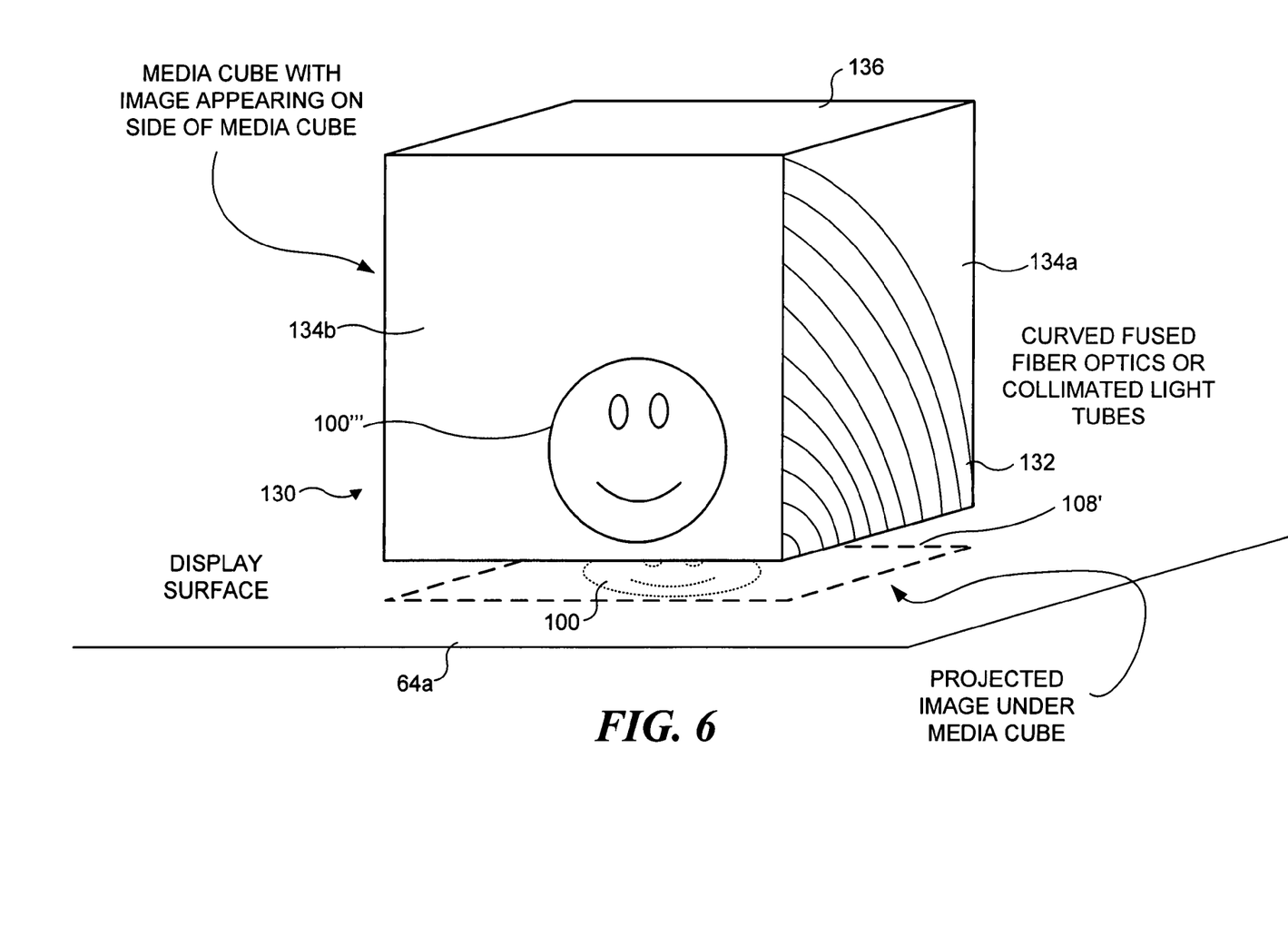
FIG. 6 is an isometric view of a third embodiment of the present invention that conveys light around a curve within the object, so that an image is conveyed from the display surface at the bottom of the object to a side of the object.

A third embodiment of an object 130 that operates somewhat differently than the first and second embodiments is illustrated in FIG. 6. Like object 120 of the second embodiment, object 130 also includes fused fiber optics or collimated light tubes 132 as schematically illustrated on a side 1134a of object 130. Again, it will be understood that this embodiment is also not limited to a cube-shaped object, although the exemplary object shown in FIG. 6 is a cube.

The fused fiber optics or collimated light tubes convey an image such as graphic icon 100 (or text, or any other image) appearing within region 108' on display surface 64a under object 130 to a side 134b of the object. An advantage of this embodiment is that the image conveyed from display surface 64a to side 134b will generally not be visible to other users who are only able to see the other three sides of object 130. Since only a player able to view side 134b of object 130 will be able to visibly perceive an image such as a graphic icon 100''' that is displayed on this side of the object, it will be apparent that this embodiment is very useful in a game or other software applications in which only a single user should be allowed to see information visible on side 134b of the object. Other users of the interactive display table who are playing the game or are participants in some other software application that is being executed with the interactive display table will thus not observe the image or text information that is conveyed onto side 134b of the object from display surface 64a. Although not illustrated, it is contemplated that a modification of this embodiment can include an image splitting device within object 130, which splits the light conveyed from region 108' on the display surface, so that the image is convey both to a top surface 136 of the object, as well as to side 134b.

Figure 7:
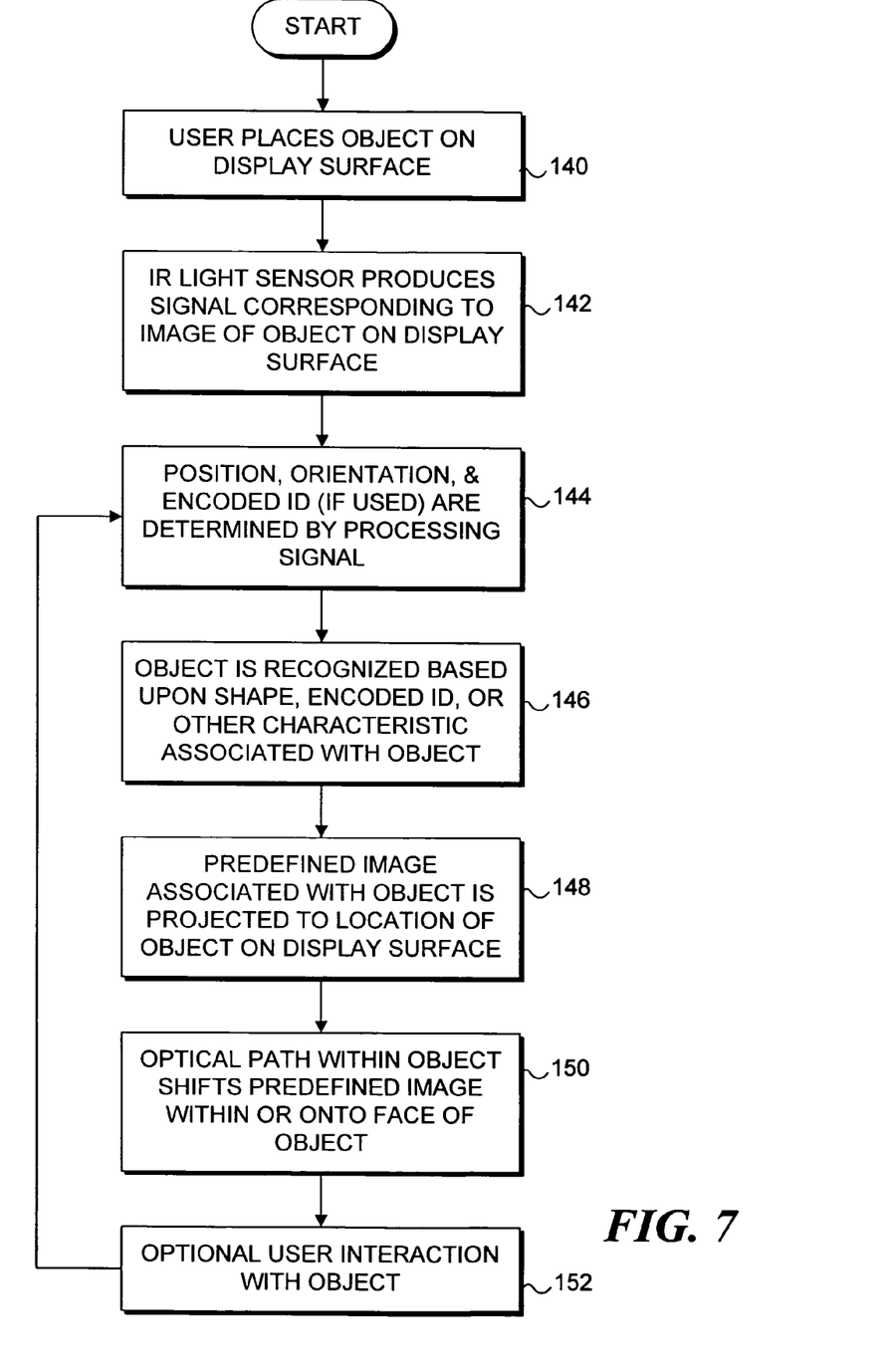
FIG. 7 is a flow chart showing the logical steps employed in the present invention.

FIG. 7 illustrates the steps involved in carrying out the present invention. These steps were generally implemented by the CPU and PC 20 or other corresponding processor to which the interactive table is coupled. Beginning after a start block, a step 140 indicates that the user places an object on the display surface. In a step 142, the IR light sensor (i.e., IR video camera 68 shown in FIG. 2) produces a signal corresponding to an image of the object that has been placed on the display surface.

In a step 144, a position, orientation, and an encoded ID (if used) of the object are determined by processing the signal corresponding to the IR light reflected back from the object. The object can be recognized based upon its shape, its encoded ID, or some other characteristic that is associated with the object that uniquely identifies the object as shown in a step 146. IR light reflected from the object is thus processed to enable the system to determine the location and orientation of the object.

A predefined image that either is associated with the object or can become associated with the object is projected onto the display surface in a step 148. The predefined image can be projected to a location of the object on the display surface, or alternatively, although not separately indicated in the flow chart shown in FIG. 7, the predefined image can be projected onto another portion of the display surface that is not under the object, if it is intended that the user may with the image in connection with the object. Next, in a step 150, an optical path within the object is employed to shift the predefined image appearing on the display surface to a different surface that is within or on a face of the object.

As noted above, the user can optionally interact with the image and the object, e.g., by employing a gesture to move the image on the display surface so that the image is caused to slide under the object as shown in a step 152. Other types of user interactions are also contemplated. For example, the user can grasp the object and move it about on the display surface, causing the displayed image to move with the object and to continue to be displayed on the side, or on intermediate surface, or on a top of the object. As a further alternative, the system can respond the user moving the object by changing parameters of the software application that is currently being executed by the PC or other computing device coupled to the interactive display, such as by raising or lowering a volume of an audio signal being played by the software application, or by changing the way that other images are displayed on the display surface.

It should thus be apparent that use of the present invention provides a richer experience for a user by facilitating additional options for interacting with images and with the object on the display surface. Also, by enabling the image to be displayed on other surfaces besides the top of the object, the present invention provides several advantages. This approach makes the image viewable from only one side of the image or can cause the image appearing on an intermediate surface to appear to float within the object.

Although the present invention has been described in connection with the preferred form of practicing it and modification thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. An object for shifting a displayed image from a display surface to a position within the object, comprising a light guide having a generally planar bottom surface that is adapted to be positioned over a display surface and to cause an image appearing on a display surface to instead appear to a viewer to be on a different surface, said light guide conveying light from the image appearing on a display surface to an intermediate surface disposed within the object, said intermediate surface being generally planar and spaced apart from an outer surface of the object wherein the object includes a portion that is generally optically transparent to enable the image appearing on the intermediate surface, which is disposed behind said portion of the object, to be visible through said portion of the object, within the object.

2. The object of claim 1, wherein the light guide comprises an optical element.

3. The object of claim 1, wherein the light guide comprises fused optical fibers.

4. The object of claim 1, wherein the light guide comprises collimated light tubes.

5. The object of claim 1, wherein the object is six-sided.

6. The object of claim 1, further comprising an identifying characteristic that is associated with the object, so that the object and a disposition of the object on the display surface are determinable by detecting the identifying characteristic of the object, to cause the image to selectively appear on the display surface under the object and to be shifted to the different surface by the object.

7. The object of claim 6, wherein the identifying characteristic comprises a light reflective marking applied to the generally planar bottom surface of the object.

8. The object of claim 7, wherein the light reflective markings are selected for reflecting infrared light.

9. A method for causing an image to appear within an object that is disposed on a display surface, comprising the steps of:
 (a) displaying the image on a portion of the display surface where the object is disposed; and
 (b) conveying the image along an optical path within the object to
 an interior surface within the object that is spaced apart from a top face of the object, so that the image appears to a viewer as visually perceivable on the interior surface within the object.

10. The method of claim 9, wherein the step of conveying the image comprises the step of employing an optical element to project the image from the display surface to the interior surface of the object, said optical element determining the optical path within the object.

11. The method of claim 9, wherein the step of conveying the image comprises the step of conveying the image through fused optical fibers that determine the optical path.

12. The method of claim 9, wherein the step of conveying the image comprises the step of conveying the image through collimated light tubes that determine the optical path.

13. The method of claim 9, wherein the optical path is curved within the object.

14. The method of claim 9, further comprising the step of detecting the object and its location on the display surface.

15. The method of claim 14, wherein the step of detecting the object and its location on the display surface comprises the steps of:
 (a) illuminating an underside of the display surface with infrared light, so that a bottom of the object disposed on the display surface is also illuminated with the infrared light;
 (b) receiving infrared light reflected from the bottom of the object through the display surface; and
 (c) processing a signal corresponding to the infrared light reflected from the object, to detect the object and determine its location on the display surface.

16. The method of claim 14, further comprising the steps of:
 (a) tracking the location of the object as the object is moved over the display surface; and
 (b) projecting the image to be conveyed within the object, so that a location of the image projected on the display surface moves relative to the display surface so as to continue to be directed toward the object.

17. The method of claim 15, further comprising the step of enabling a user to interact with an image that is not being projected where the object is disposed, to cause the image to appear to move to where the object is disposed and then to be visually perceived on interior surface within the object.

18. The method of claim 9, wherein the image comprises a plurality of media objects that have previously been associated with the object, further comprising the step of causing the one or more media object to appear to float within the object when the object is disposed on the display surface.

19. The method of claim 18, further comprising the step of causing the plurality of media objects to appear to flow from the object and onto the media surface in response to a user action.

20. The method of claim 18, further comprising the step of enabling a user to selectively add a new media object to the plurality of media objects comprising the image by associating the media object with the object, so that the new media object that is added also appears to float within the object when the object is disposed on the display surface.

21. A method for enabling a user interaction with an image appearing on a display surface, to cause the image to appear within an object that is disposed on the display surface, comprising the steps of:
 (a) displaying the image on a portion of the display surface where the object is not disposed;
 (b) enabling a user to select the image and use a gesture to move the image over the display surface toward the object;
 (c) stopping a motion of the image under the object; and
 (d) conveying the image along an optical path within the object to an interior surface within the object that is spaced apart from an external surface of the object, so that the image is visually perceivable on said one of the external surface of the object and the interior surface within the object.

22. The method of claim 21, further comprising the step of sensing a location where the object is disposed on the display surface, to enable the movement of the image to be stopped at the location of the object.

23. The method of claim 21, wherein the image comprises a media object, further comprising the step of associating the media object with the object when the image is moved under the object.

24. The method of claim 23, wherein the media object comprises one of a plurality of media objects that are associated with the object and which appear to float within the object and further comprising the step of enabling a user to selectively perform an action that causes the plurality of media objects to appear to flow from the object and be displayed on the display surface, outside of the object.

* * * * *